United States Patent
Takabayashi

(10) Patent No.: US 9,438,755 B2
(45) Date of Patent: Sep. 6, 2016

(54) IMAGE READING APPARATUS INCLUDING AN ENGAGEMENT SECTION FOR ENGAGING A HOUSING AND FRAME MEMBER

(71) Applicant: SEIKO EPSON CORPORATION, Tokyo (JP)

(72) Inventor: Kazunori Takabayashi, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/740,673

(22) Filed: Jun. 16, 2015

(65) Prior Publication Data
US 2015/0381835 A1 Dec. 31, 2015

(30) Foreign Application Priority Data
Jun. 26, 2014 (JP) ................................ 2014-131052

(51) Int. Cl.
*H04N 1/00* (2006.01)
*H04N 1/10* (2006.01)

(52) U.S. Cl.
CPC ........ *H04N 1/00522* (2013.01); *H04N 1/1065* (2013.01); *H04N 2201/0081* (2013.01); *H04N 2201/0422* (2013.01)

(58) Field of Classification Search
None
See application file for complete search history.

(56) References Cited

U.S. PATENT DOCUMENTS 6,806,944 B2 * 10/2004 Votipka .................. G03B 27/62
16/239
7,567,365 B2 * 7/2009 Tsujimoto ............ H04N 1/1017
358/474

FOREIGN PATENT DOCUMENTS

JP 2012-199873 A 10/2012

* cited by examiner

*Primary Examiner* — Thomas D Lee
(74) *Attorney, Agent, or Firm* — Workman Nydegger

(57) ABSTRACT

A scanner includes: platen glass, a housing, and an upper left frame (and an upper right frame) which is formed around the platen glass. An engagement section at which the upper left frame engages with the housing is configured to include a hook and a loop member. The hook includes a first inclined portion that allows engagement with the loop member to be performed when the upper left frame is attached to the housing in a vertically downward direction and a second inclined portion that allows the loop member to be disengaged from an engaged state between the hook and the loop member when the upper left frame is shifted with respect to the housing in a second direction intersecting with a first direction.

11 Claims, 12 Drawing Sheets

IMAGE READING APPARATUS INCLUDING AN ENGAGEMENT SECTION FOR ENGAGING A HOUSING AND FRAME MEMBER

BACKGROUND

1. Technical Field

The present invention relates to an image reading apparatus typified by a scanner.

2. Related Art

As an image reading apparatus, a scanner, particularly, a so-called flatbed scanner in which a read sensor travels under platen glass and reads an image, as an example, is configured to have a frame member (frame) around the platen glass as disclosed in JP-A-2012-199873 and the frame member is fixed to both the platen glass and a lower housing member (housing).

Normally, the frame member (frame), with which the platen glass described above is edged, is fixed to the lower housing member (housing) by means of fixing such as screw fixing or hook fixing. However, in a case where maintenance or adjustment is necessary after an apparatus is assembled, it is difficult to release fitting in the hook fixing and thus, there is concern that forced release of fitting will result in damage to the apparatus. In addition, when there is provided a hole into which a pin, a driver, or the like is inserted so as to release the fitting, dust, grit, or the like infiltrates inside the apparatus, which is unfavorable, particularly, for a scanner. In addition, it is time consuming and laborious to release a screw from the screw fixing and space for a screw hole is required, which is contrary to a demand for miniaturization of the apparatus.

SUMMARY

An advantage of some aspects of the invention is that improvement of ease of disassembly after assembly and the suppression of an increase of a size of an apparatus are compatibly achieved in an image reading apparatus.

According to a first aspect of the invention, an image reading apparatus includes a platen on which an original document is mounted; a housing in which a read section that reads the original document mounted on the platen is provided; and at least one frame which is attached to the housing by using an engagement section and is formed around the platen. The engagement section is configured to include a first engagement section provided on one side of the housing or the frame and a second engagement section provided on the other side thereof. The first engagement section includes a first inclined portion that allows engagement with the second engagement section to be performed when the frame is attached to the housing in a first direction including a vertically downward direction component, and a second inclined portion that allows the second engagement section to be disengaged from an engaged state between the first engagement section and the second engagement section when the frame is shifted with respect to the housing in a second direction intersecting with the first direction.

In this case, the engagement section of the frame and the housing is configured to include the first engagement section and the second engagement section and the first engagement section includes the first inclined portion that allows engagement with the second engagement section to be performed when the frame is attached to the housing in a first direction including a vertically downward direction component. Therefore, it is possible to attach the frame to the housing in a simple work operation.

Since the first engagement section includes the second inclined portion that allows the second engagement section to be disengaged from the engaged state between the first engagement section and the second engagement section when the frame is shifted with respect to the housing in the second direction intersecting with the first direction, the frame is shifted in the second direction such that it is possible to easily detach the frame from the housing. When such a function is realized, no screw hole needs to be provided such that it is possible to suppress an increase of a size of the apparatus.

According to a second aspect of the invention, an image reading apparatus includes a platen on which an original document is mounted; a housing in which a read section that reads the original document mounted on the platen is provided; and at least one frame which is attached to the housing and is formed around the platen. An engagement section at which the housing engages with the frame is configured to include a first engagement section provided on one side of the housing or the frame and a second engagement section provided on the other side thereof. The first engagement section engages with the second engagement section when the frame is attached to the housing in a first direction including a vertically downward direction component. The first engagement section is disengaged from the second engagement section from an engaged state between the first engagement section and the second engagement section when the frame is shifted with respect to the housing in a second direction intersecting with the first direction.

In this case, the engagement section of the frame and the housing is configured to include the first engagement section and the second engagement section and the first engagement section engages with the second engagement section when the frame is attached to the housing in a first direction including a vertically downward direction component. Therefore, it is possible to attach the frame to the housing in a simple work operation.

Since the first engagement section is disengaged from the second engagement section from the engaged state between the first engagement section and the second engagement section when the frame is shifted with respect to the housing in the second direction intersecting with the first direction, the frame is shifted in the second direction such that it is possible to easily detach the frame from the housing. When such a function is realized, no screw hole needs to be provided such that it is possible to suppress an increase of a size of the apparatus.

According to a third aspect of the invention, in the image reading apparatus according to the first or second aspect, a plurality of the engagement sections may be provided at appropriate intervals in the second direction.

In this case, since the plurality of engagement sections are provided at appropriate intervals in the second direction, it is possible to more tightly attach the frame to the housing.

According to a fourth aspect of the invention, the image reading apparatus according to any one of the first to third aspects may further include a first frame and a second frame, as the frame, which are positioned on both sides of the platen, respectively, in a direction intersecting with a traveling direction of the read section. The first frame and the second frame are integrated with the platen and are shifted in the second direction.

In this case, since the first frame and the second frame as the frame are integrated with the platen and are shifted in the second direction, it is possible to disassemble the image reading apparatus in a simple work operation.

According to a fifth aspect of the invention, the image reading apparatus according to the fourth aspect may further include a third frame and a fourth frame which are positioned on both sides in the traveling direction of the read section, respectively. At least one of the third frame or the fourth frame is detached and the first frame, the second frame, and the platen are able to shift in the second direction in an integrated manner.

In this case, since at least one of the third frame or the fourth frame is detached and the first frame, the second frame, and the platen are able to shift in the second direction in an integrated manner, it is possible to reliably maintain a state in which a plurality of components of the first frame, the second frame, and the platen are fixed to the housing by either the third frame or the fourth frame.

According to a sixth aspect of the invention, in the image reading apparatus according to the first aspect, the first engagement section may be a protrusion on which the first inclined portion and the second inclined portion are formed, and the second engagement section may be a loop member having a window hole into which the protrusion is fit.

In this case, the first engagement section and the second engagement section can have a simple structure and can be configured at a low cost.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an embodiment of the invention will be described based on the drawings; however, the invention is not limited to the embodiment to be described below, various modifications can be performed in a scope of the invention described in what is claimed, and an embodiment of the invention will be described on a premise that the modifications are included in the scope of the invention.

Figure 1:
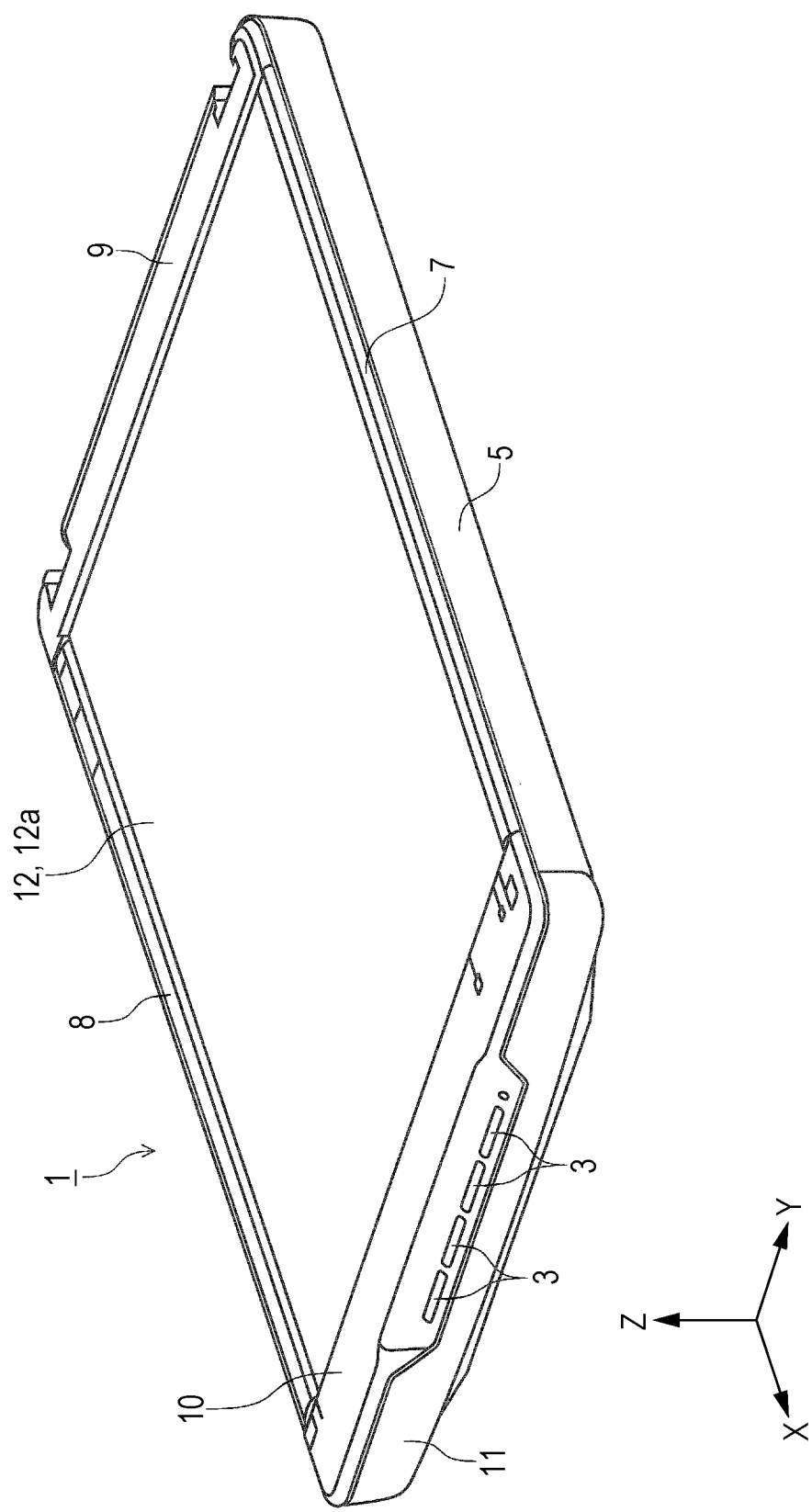
FIG. 1 is a perspective view of the appearance of a scanner according to an embodiment of the invention.
Figure 2:
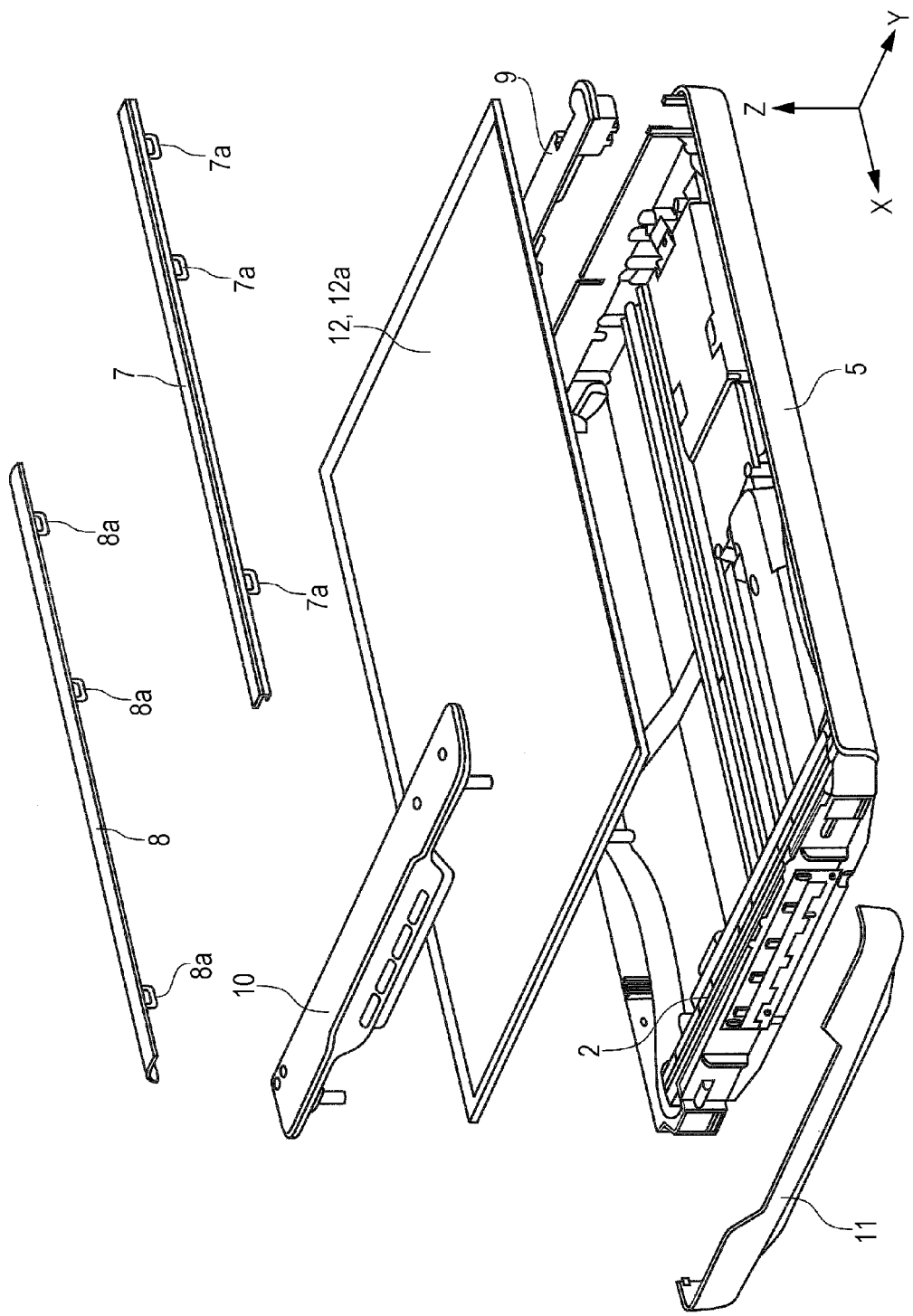
FIG. 2 is an exploded perspective view of the scanner according to the embodiment of the invention.
Figure 3:
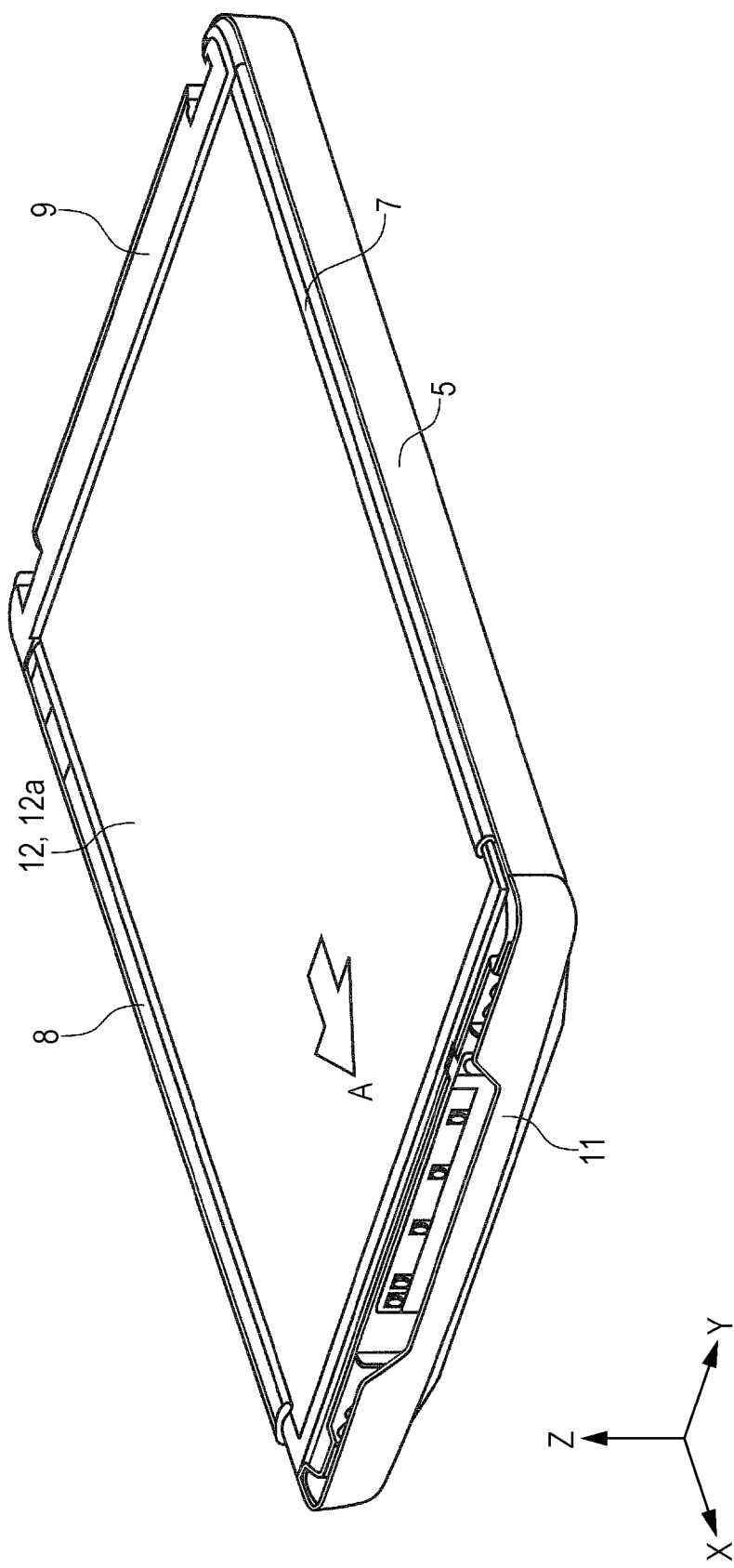
FIG. 3 is a partially exploded perspective view of the scanner according to the embodiment of the invention.
Figure 4:
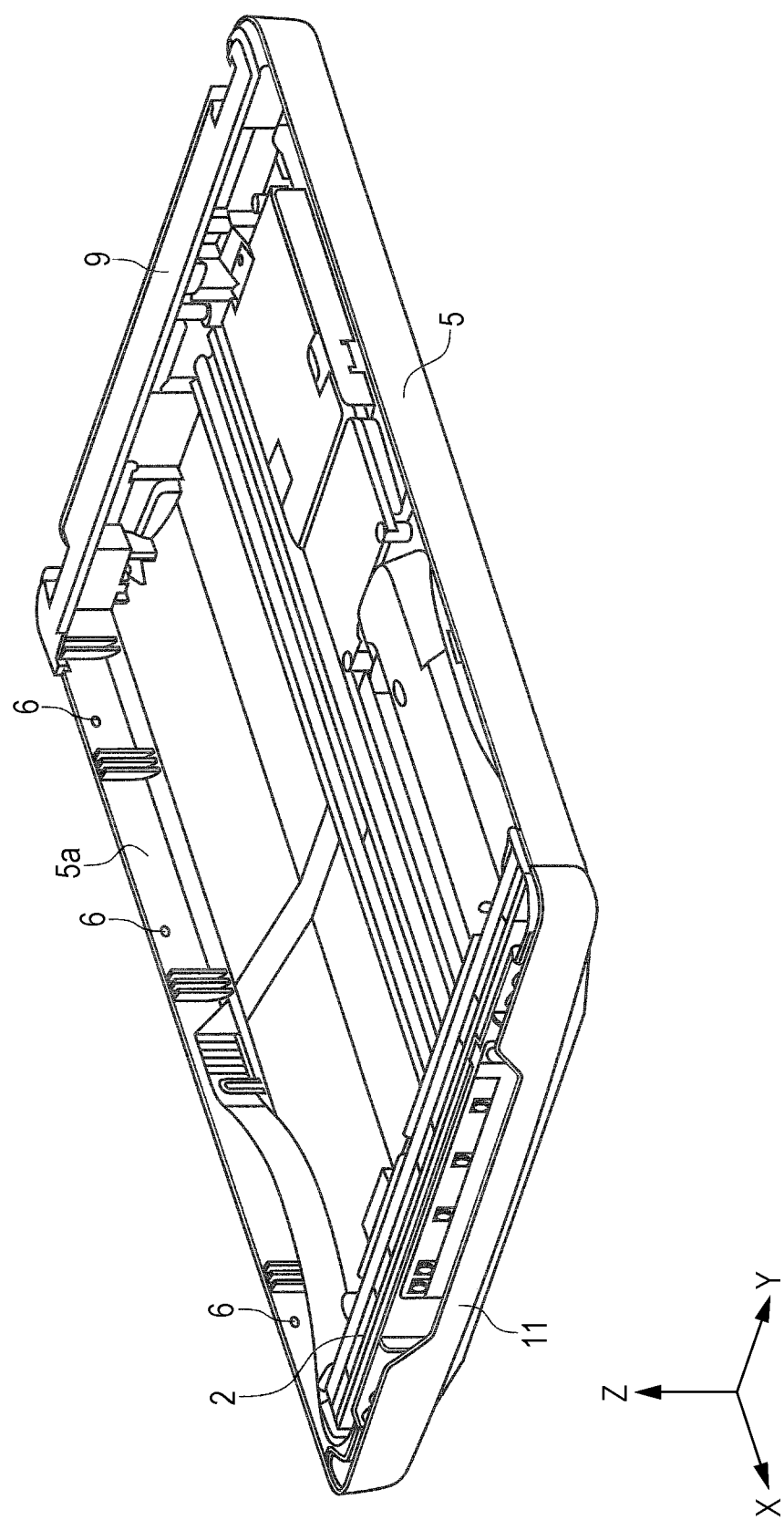
FIG. 4 is a partially exploded perspective view of the scanner according to the embodiment of the invention.
Figure 5:
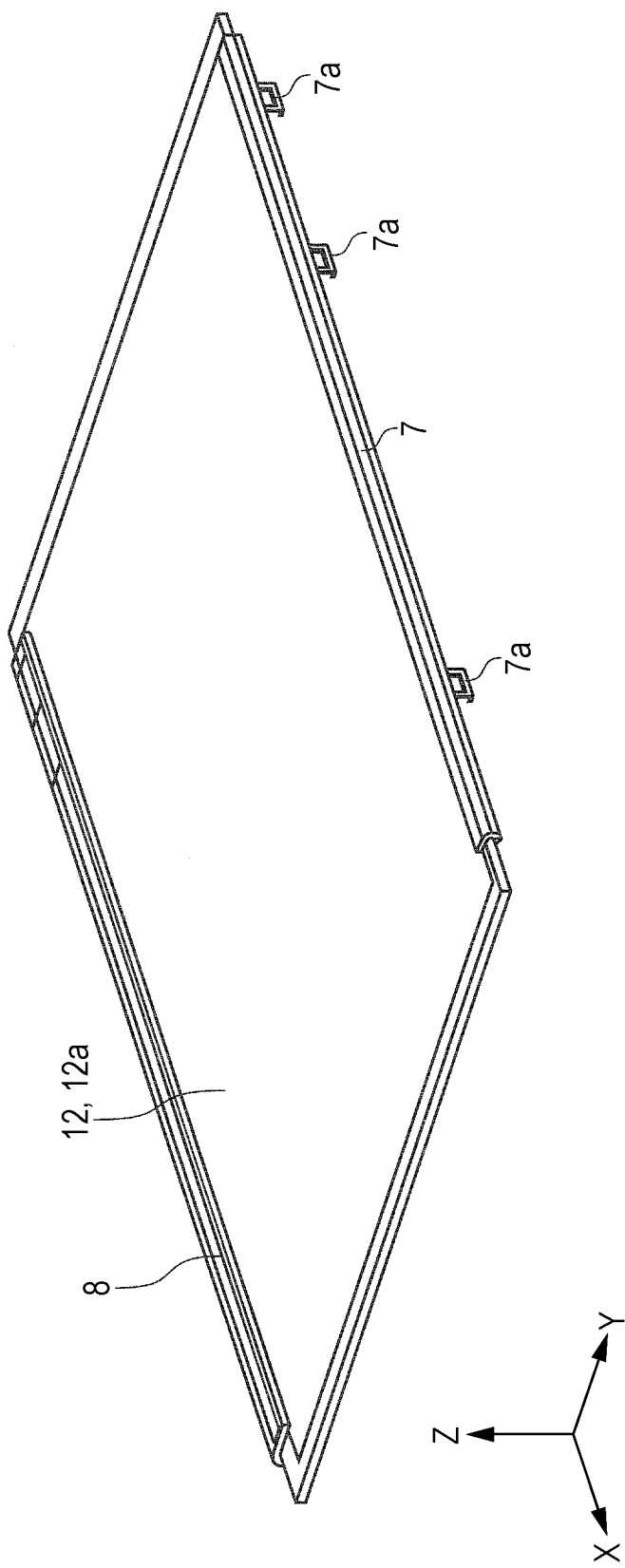
FIG. 5 is a perspective view of a platen glass and right-side and left-side upper frames.
Figure 6:
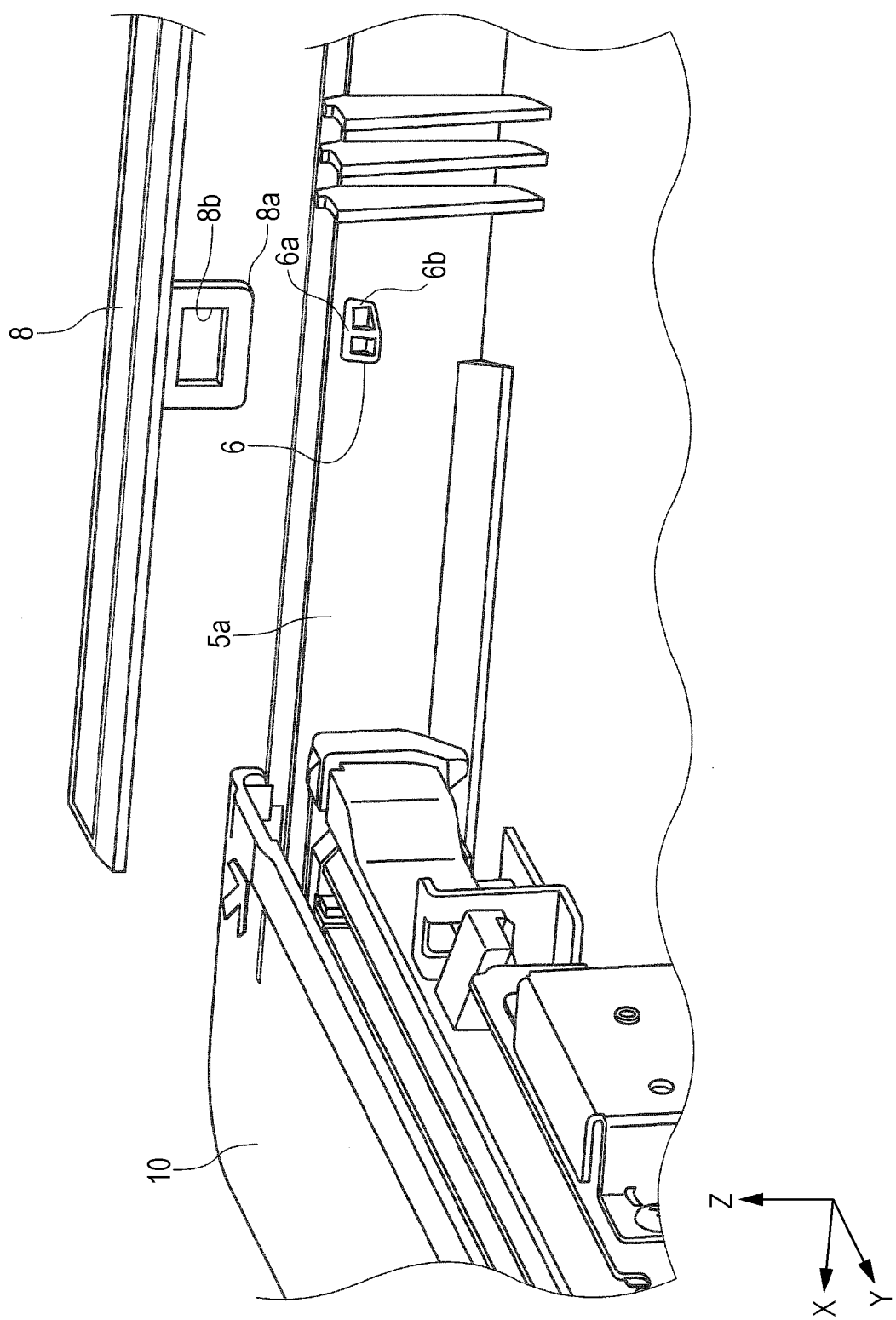
FIG. 6 is a perspective view of a first engagement section and a second engagement section (disengaged state).
Figure 7:
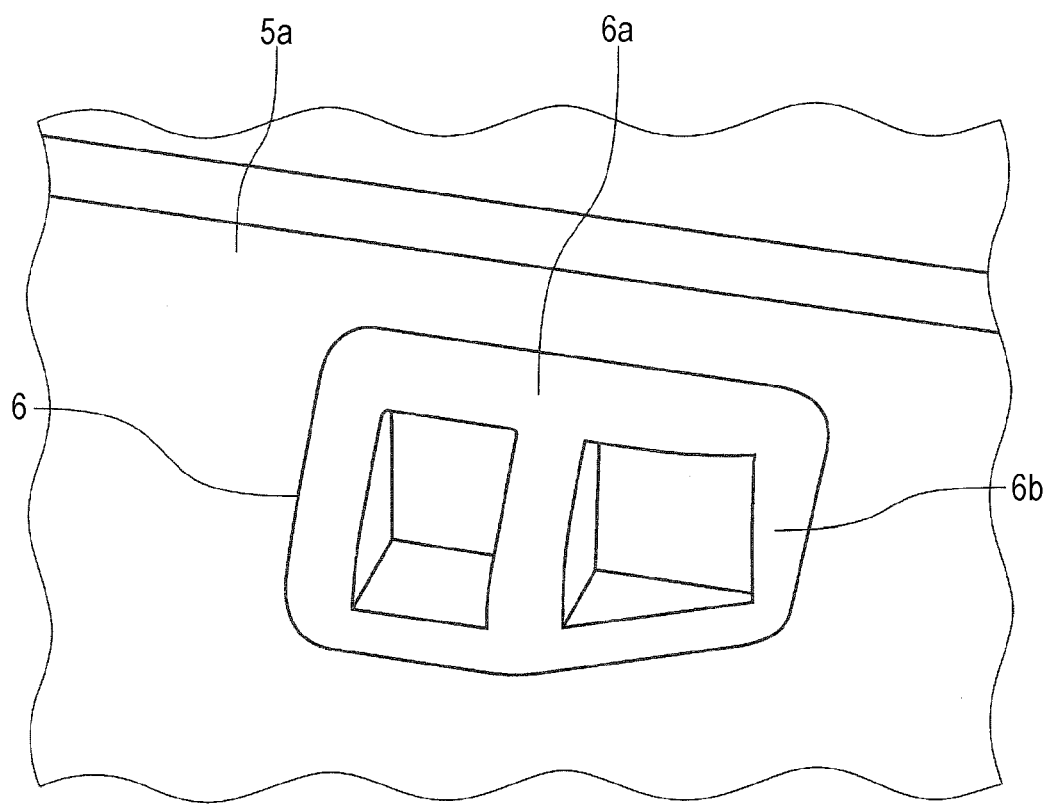
FIG. 7 is a perspective view of the first engagement section.
Figure 8:
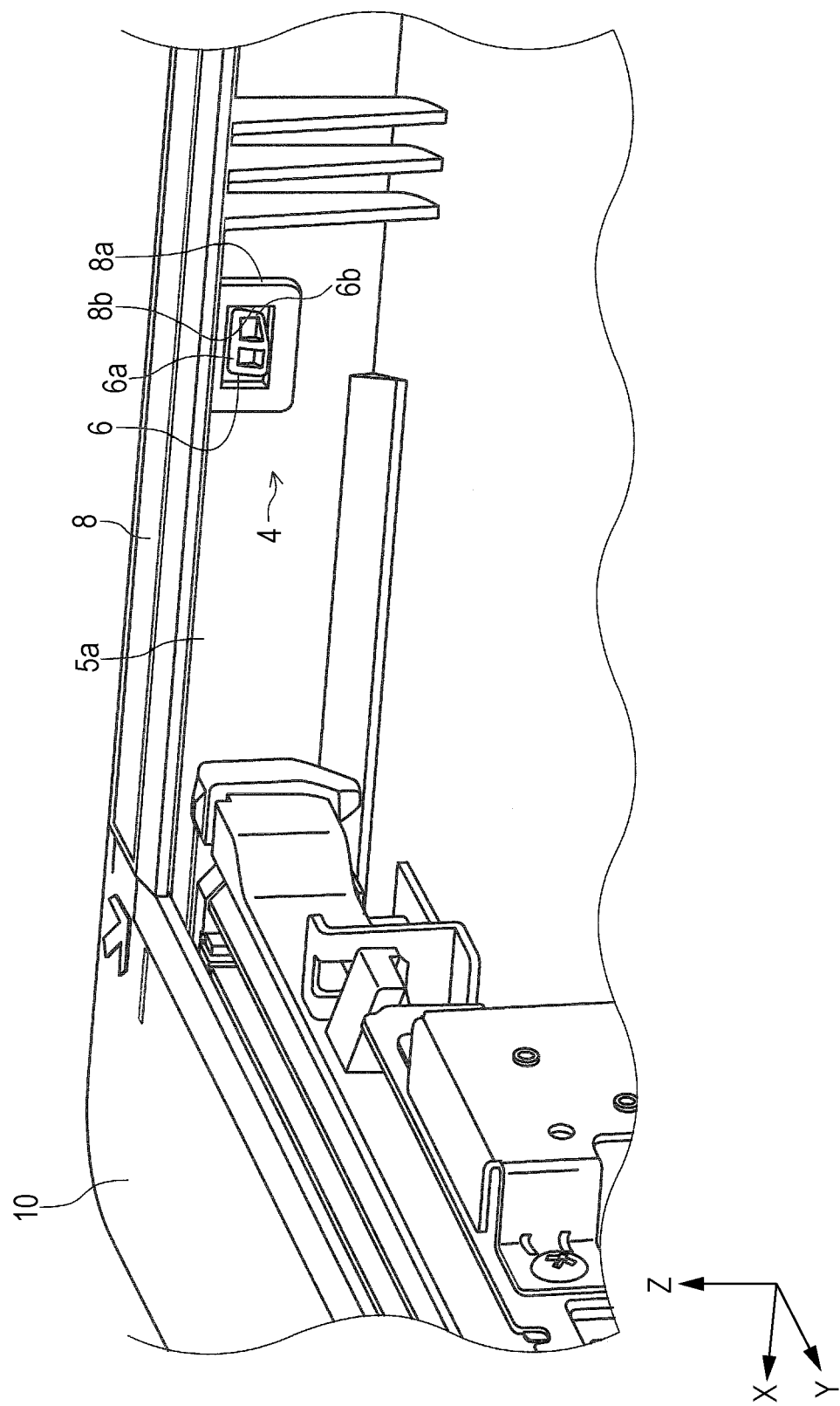
FIG. 8 is a perspective view of the first engagement section and the second engagement section (engaged state).
Figure 9:
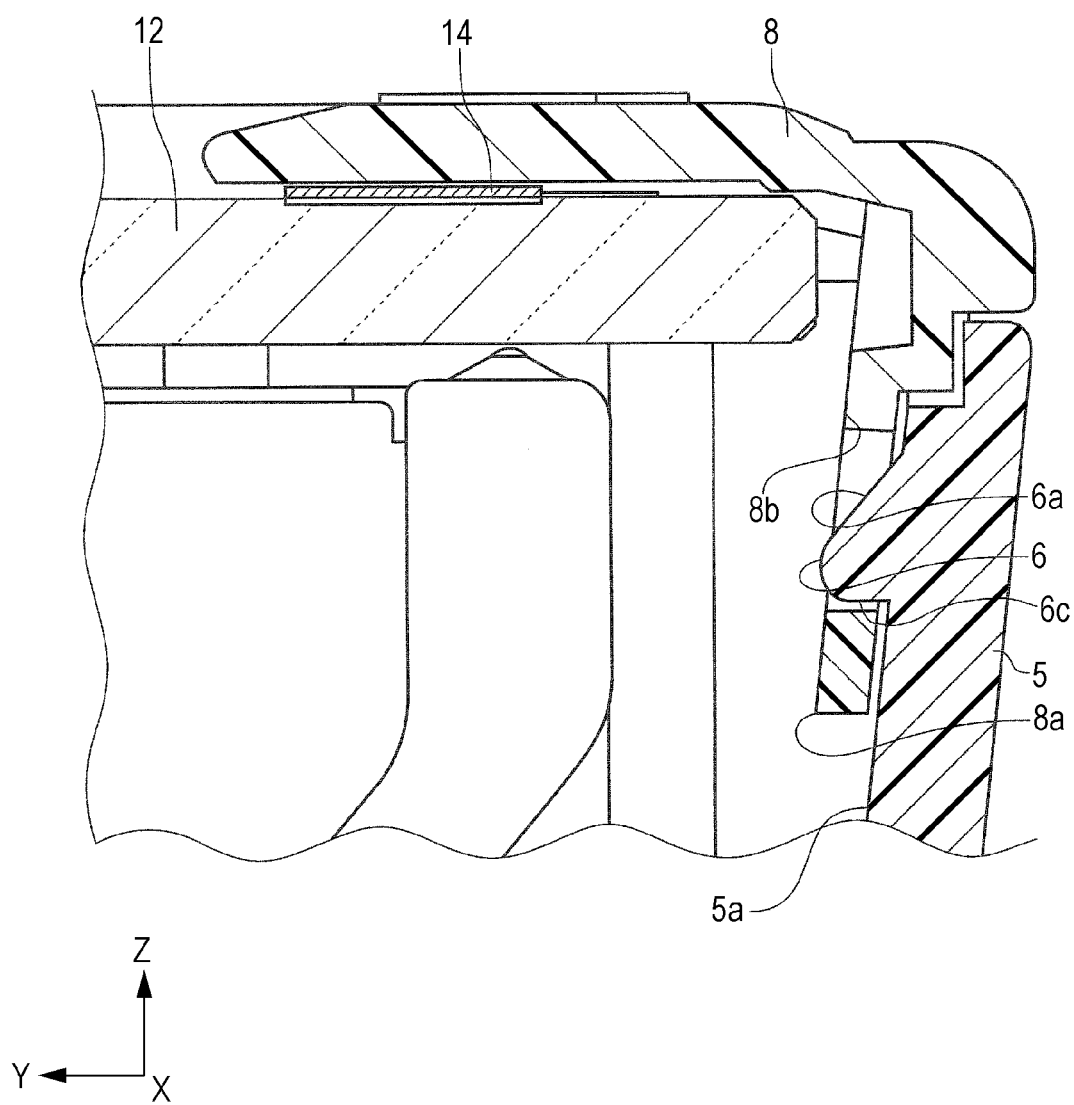
FIG. 9 is a sectional view of the first engagement section and the second engagement section (engaged state).
Figure 10:
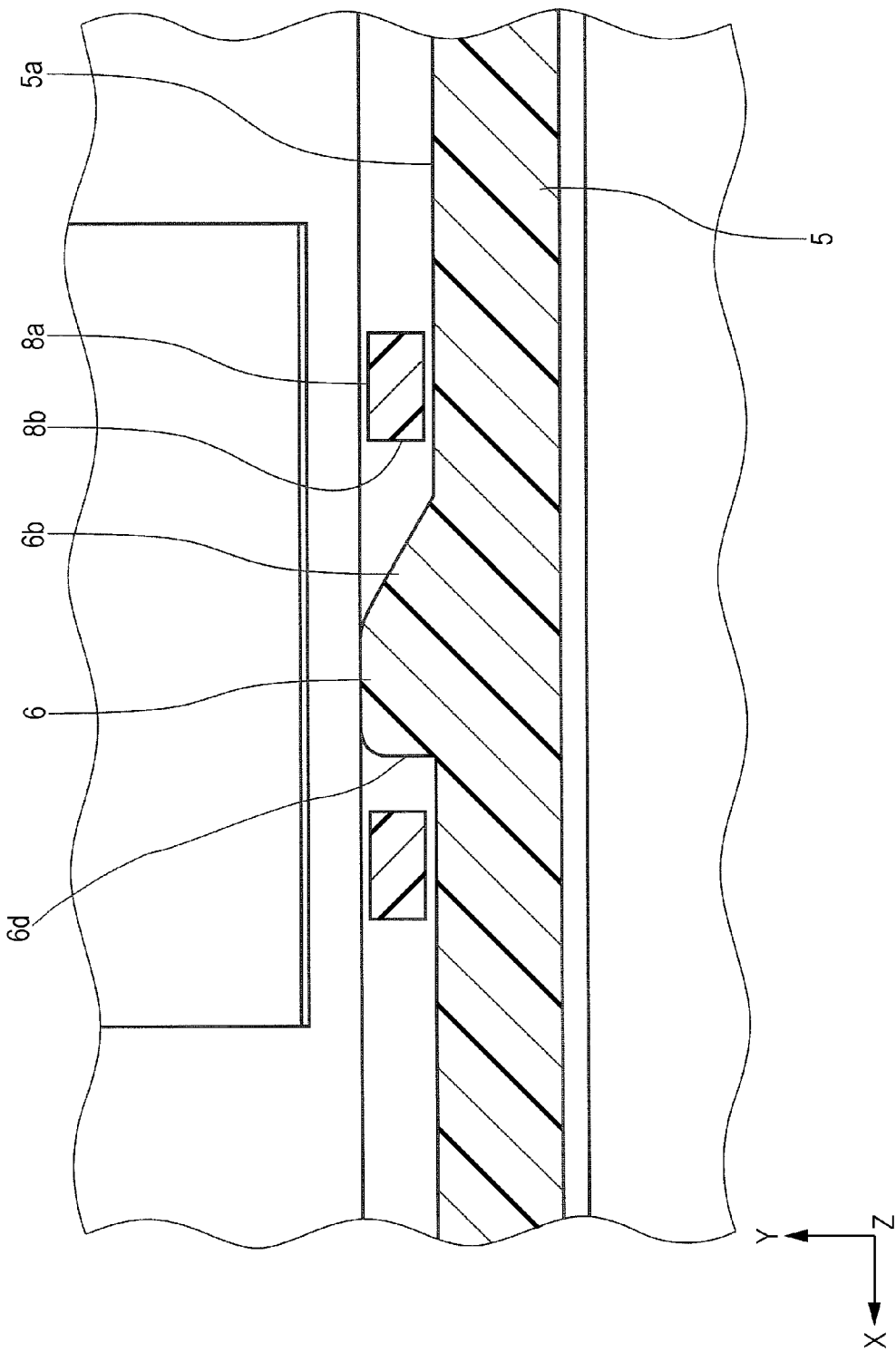
FIG. 10 is a sectional view of the first engagement section and the second engagement section (engaged state).
Figure 11:
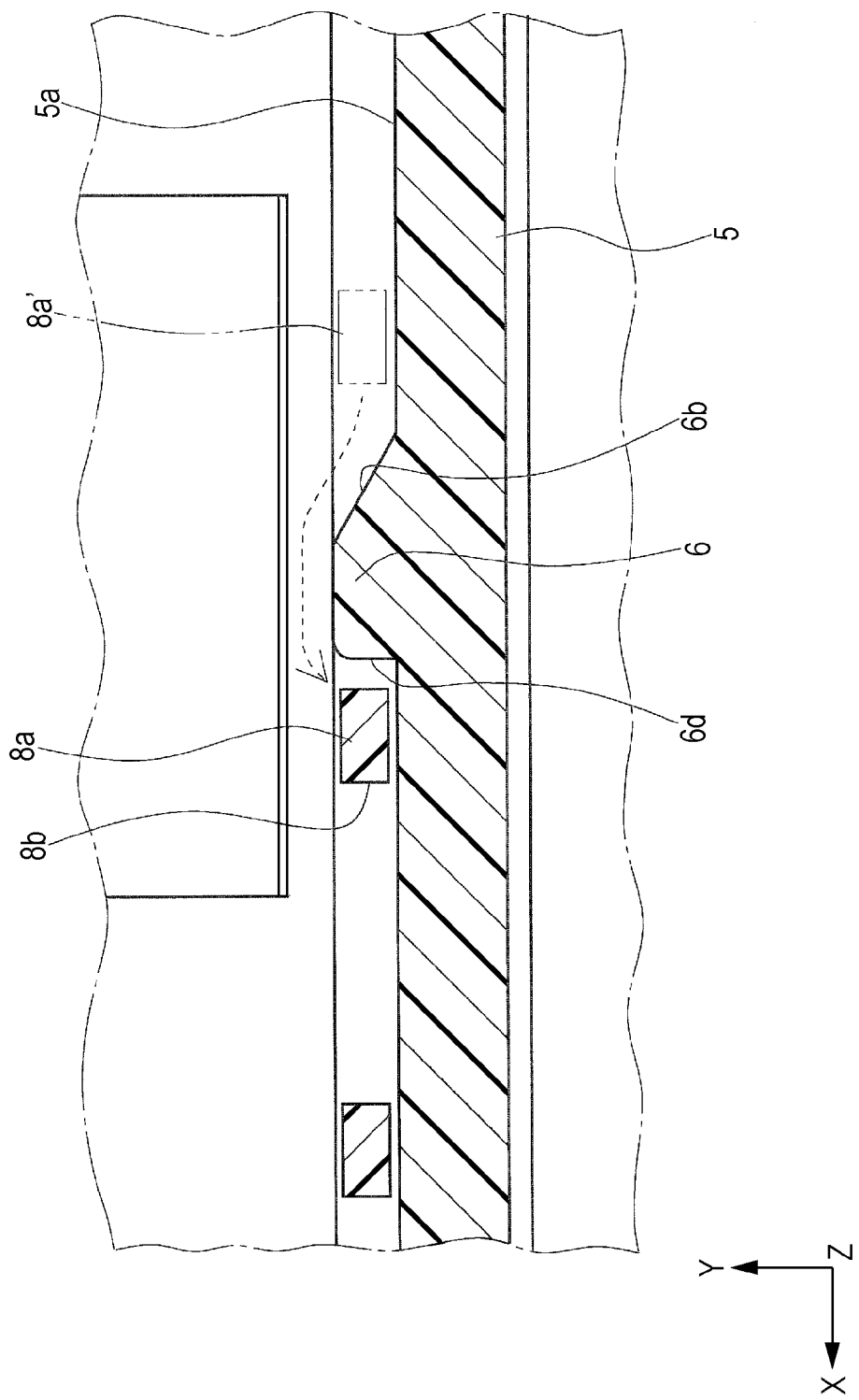
FIG. 11 is a sectional view of the first engagement section and the second engagement section (disengaged state).
Figure 12A:
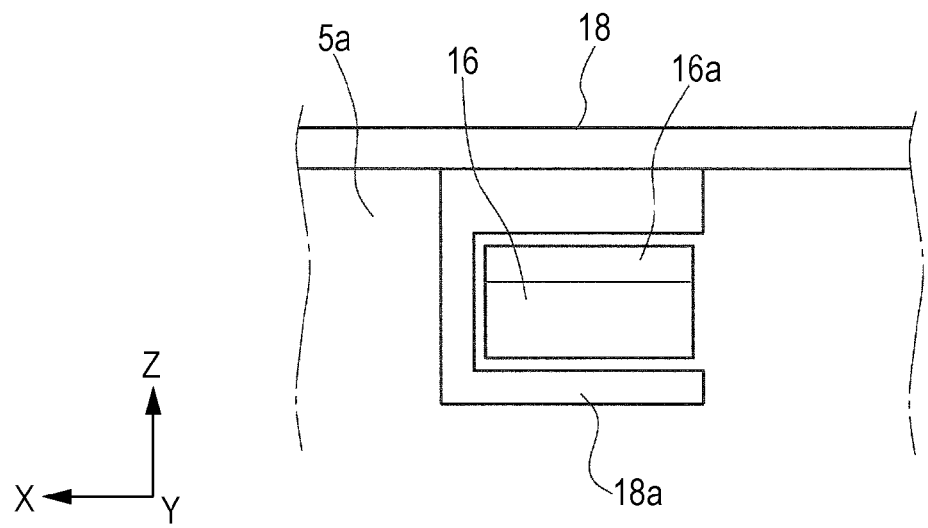
FIGS. 12A and 12B are front views of a first engagement section and a second engagement section according to another embodiment.
Figure 12B:
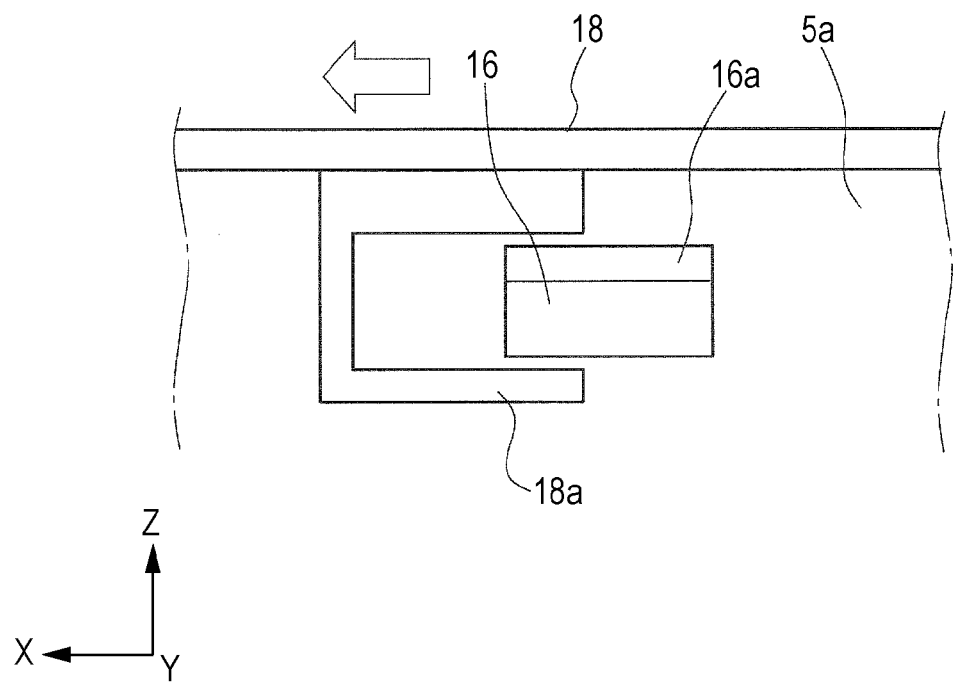

FIG. 1 is a perspective view of the appearance of a scanner 1 as an example of an image reading apparatus according to an embodiment of the invention. FIG. 2 is an exploded perspective view of the scanner 1. FIG. 3 and FIG. 4 are partially exploded perspective views of the scanner 1. FIG. 5 is a perspective view of a platen glass 12, a left-side upper frame 8, and a right-side upper frame 7. FIG. 6 is a perspective view of a hook 6 as a first engagement section and a loop member 8a as a second engagement section (disengaged state). FIG. 7 is a perspective view of the hook 6. FIG. 8 is a perspective view of the hook 6 and the loop member 8a (engaged state). FIG. 9 and FIG. 10 are sectional views of the hook 6 and the loop member 8a (engaged state). FIG. 11 is a sectional view of the hook 6 and the loop member 8a (disengaged state). FIGS. 12A and 12B are front views of a first engagement section (hook 16) and a second engagement section (loop member 18a) according to another embodiment.

In an X-Y-Z orthogonal coordinate system shown in the drawings, an X direction and a Y direction compose a horizontal direction and the X direction is a scanning direction of a read unit 2 and also a frontward-rearward direction of the scanner 1. In addition, the Y direction is an extending direction (direction orthogonal to the scanning direction) of the read unit 2 and a rightward-leftward direction of the scanner 1. In addition, a Z direction is a gravitational direction and an apparatus height direction.

Hereinafter, a configuration of the scanner 1 will be outlined with reference to FIG. 1 and FIG. 2. The scanner 1 includes the platen glass 12 and a top surface of the platen glass 12 forms an original-document mounting surface 12a on which an original document is mounted. The platen glass 12 is a transparent glass plate in the present embodiment. The platen glass 12 is edged with a plurality of frames and a rectangular region edged with these frames becomes an original-document reading region (original-document mounting surface 12a) on which the read unit 2 which will be described below can perform reading.

The scanner 1 includes an openable/closable cover (not illustrated) and the cover is configured such that the original-document mounting surface 12a is opened and covered. In addition, the cover has an original-document pressing mat (not illustrated) formed of an elastic material (for example, sponge) and an original document mounted on the original-document mounting surface 12a is pressed against the original-document pressing mat when the cover is closed such that a surface on which reading is performed is brought into close contact with the original-document mounting surface 12a.

The frames with which the original-document mounting surface 12a is edged are configured to have, specifically, the right-side upper frame 7, the left-side upper frame 8, a rear frame 9, and an upper front frame 10. These frames are attached to a housing 5. A lower front frame 11 is attached to the housing 5 on the lower side of the upper front frame 10. The above frames and the housing 5 are all formed of a resin material in the present embodiment.

The housing 5 has a box shape and the read unit 2 is provided in the housing 5. That is, the scanner 1 according to the present embodiment is a flatbed-type scanner and the read unit 2 is provided on the lower side of the platen glass 12 so as to relatively travel with respect to the platen glass 12. The read unit 2 is provided so as to travel in the X direction in the present embodiment.

The read unit 2 is configured as an optical unit which irradiates the original document mounted on the original-document mounting surface 12a with light, receives reflected light from the original document, and reads information on the original document and is configured, for example, as a charge coupled devices (CCD) type or contact image sensor (CIS) type optical unit.

Next, an attachment structure of each member to the housing 5, particularly, attachment structures (engagement sections) of the right-side upper frame 7 and the left-side upper frame 8 to the housing 5 will be described.

In FIG. 2, an attachment of each member to the housing 5 is performed in an order from the rear frame 9, the platen glass 12, the lower front frame 11, the right-side upper frame 7 and the left-side upper frame 8, and the upper front frame 10.

The scanner 1 according to the present embodiment is characterized by the attachment structures of the right-side upper frame 7 and the left-side upper frame 8 to the housing 5. Hence, hereinafter, the attachment structures will be described and description of the attachment structures of the other frames (the rear frame 9, the lower front frame 11, and the upper front frame 10) to the housing 5 is not provided. Attachments of the other frames to the housing 5 can be performed through various fixing methods such as screw fixing, fitting fixing, and adhesion fixing.

In addition, the attachment structures of the right-side upper frame 7 and the left-side upper frame 8 to the housing 5 are the same and hereinafter, particularly, the attachment structure of the left-side upper frame 8 to the housing 5 will be described as an example.

First, the loop member 8a as the second engagement section is formed on the lower side of the left-side upper frame 8. A plurality of loop members 8a are formed at appropriate intervals in the X direction, that is, in the scanning direction of the read unit 2. Reference sign 7a in FIG. 2 represents a loop member as the second engagement section formed on the right-side upper frame 7 in the same way.

As illustrated in FIG. 4 and FIG. 6 to FIG. 9, the hooks 6 as the first engagement sections are formed on an inside wall 5a of the housing 5. A plurality of hooks 6 are formed on the inside wall 5a at appropriate intervals in the X direction, that is, in the scanning direction of the read unit 2. The hooks 6 are provided at positions corresponding to formation positions of the loop member 8a formed on the left-side upper frame 8.

As illustrated in FIG. 6 and FIG. 7, the hook 6 is formed to have a shape of a protrusion protruding from the inside wall 5a, is fit into a window hole 8b of the loop member 8a, and holds the left-side upper frame 8, particularly, such that the left-side upper frame 8 is not detached upwardly (FIG. 8 and FIG. 9) when the left-side upper frame 8 is fixed to the housing 5 downwardly (first direction) from above (FIG. 6).

As illustrated in FIG. 7 and FIG. 9, the hook 6 includes a first inclined portion 6a on the upper side thereof. The first inclined portion 6a is formed so as to allow engagement with the loop member 8a to be performed when the loop member 8a is fit with the hook 6 downwardly from above. That is, the first inclined portion 6a is formed to have an inclined shape with which interruption is suppressed and smooth fitting is performed when the loop member 8a is fit with the hook 6 downwardly from above. The hook 6 is formed to have a substantially flat surface on the lower side (surface 6c in FIG. 9) such that upward detachment of the loop member 8a is prevented after the loop member 8a is fit with the hook 6.

That is, the hook 6 functions as a hook and prevents the loop member 8a, that is, the left-side upper frame 8 from detaching upwardly.

In this manner, after the left-side upper frame 8 (and the right-side upper frame 7) is attached to the housing 5, the attachment of the upper front frame 10 is performed, and then, the attachment of the frames are completed.

However, in a case where maintenance or adjustment is necessary after the apparatus is assembled, detachment of the platen glass 12 from the housing 5 is required. In order to detach the platen glass 12 from the housing 5, detachment of the left-side upper frame 8 and the right-side upper frame 7 from the housing 5 is required. The hook 6 has a second inclined portion which allows the detachment of the left-side upper frame 8 and the right-side upper frame 7 from the housing 5 to be easily performed.

That is, as illustrated in FIG. 7 and FIG. 10, the hook 6 has the second inclined portion 6b on the rear frame 9 side (−X direction side). The second inclined portion 6b is formed to have an inclined shape which allows the loop member 8a to be disengaged from an engaged state between the hook 6 and the loop member 8a when the left-side upper frame 8 is shifted to the upper front frame 10 side (+X direction: second direction) with respect to the housing 5. A side opposite to the second inclined portion 6b is formed as a surface (reference sign 6d in FIG. 10) which restrains a movement of the loop member 8a to the rear frame 9 side (−X direction).

In the above configuration, after the left-side upper frame 8 (and the right-side upper frame 7) is fit to the housing 5 downwardly from above, that is, in the first direction including a vertically downward direction component, an upward movement of the upper frame is restrained but a movement thereof toward the second direction (horizontal direction (+X direction) in the present example) which is a direction intersecting with the first direction is allowed.

Hence, when the left-side upper frame 8 (and the right-side upper frame 7) is detached after the scanner 1 is assembled, the upper front frame 10 is first detached as shown in the state in FIG. 3. The left-side upper frame 8 (and the right-side upper frame 7) is caused to slide in an arrow A direction (+X direction) in FIG. 3 from the above state, then, the loop member 8a and the hook 6 are easily disengaged from each other, and it is possible to detach the left-side upper frame 8 (and the right-side upper frame 7) from the housing 5. FIG. 11 illustrates a state after the loop member 8a moves over the hook 6 as shown with a dashed arrow from a position (before the movement) of reference sign 8a' from the state in FIG. 10. In addition, FIG. 4 illustrates a state after the detachment therefrom.

The platen glass 12 is fixed to the left-side upper frame 8 (and the right-side upper frame 7) using a double-sided adhesive tape 14 (FIG. 9). Hence, the left-side upper frame 8, the right-side upper frame 7, and the platen glass 12 form an assembly body as illustrated in FIG. 5 and can be integrated and can be detached when the assembly body is caused to slide in the A direction from the state in FIG. 3.

As described above, the scanner 1 according to the invention includes the platen glass 12 on which the original document is mounted, the housing 5 in which the read unit 2 as a read section which reads the original document mounted on the platen glass 12, and at least one frame which is attached to the housing 5 and is formed around the platen glass 12. An engagement section 4 (FIG. 8) at which the left-side upper frame 8 (and the right-side upper frame 7) which corresponds to the at least one frame engages with the housing 5 is configured to include the hook 6 as the first engagement section provided on the housing 5 and the loop member 8a as the second engagement section provided on the left-side upper frame 8 (and the right-side upper frame 7).

The hook 6 includes the first inclined portion 6a which allows engagement with the loop member 8a to be performed when the left-side upper frame 8 (and the right-side upper frame 7) is attached to the housing 5 in the first direction including the vertically downward direction component and the second inclined portion 6b that allows the loop member 8a to be disengaged from the engaged state between the hook 6 and the loop member 8a when the left-side upper frame 8 (and the right-side upper frame 7) is shifted with respect to the housing 5 in the second direction intersecting with the first direction.

When the left-side upper frame 8 (and the right-side upper frame 7) is attached to the housing 5 in the first direction including the vertically downward direction component, the first inclined portion 6a makes it possible to attach the left-side upper frame 8 (and the right-side upper frame 7) to the housing 5 in a simple work operation. Since the hook 6 includes the second inclined portion 6b that allows the loop member 8a to be disengaged from the hook when the left-side upper frame 8 (and the right-side upper frame 7) is shifted with respect to the housing 5 in the second direction intersecting with the first direction, the left-side upper frame 8 (and the right-side upper frame 7) is shifted in the second direction such that it is possible to easily detach the left-side upper frame 8 (and the right-side upper frame 7) from the housing 5. When such a function is realized, no screw hole needs to be provided such that it is possible to suppress an increase of a size of the apparatus.

The above configuration can be described from a point of functional view as follows. In other words, the engagement section 4 at which the left-side upper frame 8 (and the right-side upper frame 7) engages with the housing 5 includes the hook 6 as the first engagement section and the loop member 8a as the second engagement section and the hook 6 engages with the loop member 8a when the left-side upper frame 8 (and the right-side upper frame 7) is attached to the housing 5 in the first direction including the vertically downward direction component. The hook 6 is disengaged from the loop member 8a from the engaged state between the hook 6 and the loop member 8a when the left-side upper frame 8 (and the right-side upper frame 7) is shifted with respect to the housing 5 in the second direction intersecting with the first direction.

In addition, according to the present embodiment, the hook 6 as the first engagement section is a protrusion formed on the first inclined portion 6a and the second inclined portion 6b and the loop member 8a as the second engagement section is a loop member having the window hole 8b into which the hook 6 as the protrusion is fit. Therefore, the first engagement section and the second engagement section can have a simple structure and can be configured at a low cost.

In addition, according to the present embodiment, since a plurality of the engagement sections 4 are provided at appropriate intervals in the second direction (+X direction according to the present embodiment), it is possible to more tightly attach the left-side upper frame 8 (and the right-side upper frame 7) to the housing 5.

In addition, according to the present embodiment, the left-side upper frame 8 as the first frame and the right-side upper frame 7 as the second frame are provided to position on both sides of the platen glass 12 in a direction (Y direction) intersecting with a traveling direction (X direction) of the read unit 2 and the left-side upper frame 8, the right-side upper frame 7, and the platen glass 12 are integrated and are shifted in the second direction. Therefore, the scanner 1 can be disassembled in a simple work operation.

In addition, according to the present embodiment, the rear frame 9 as a third frame and the upper front frame 10 as a fourth frame are provided to be positioned on both sides in the traveling direction (X direction) of the read unit 2, at least one frame (upper front frame 10 in the present embodiment) of the third frame or the fourth frame is detached, and then, the left-side upper frame, the right-side upper frame 7, and the platen glass 12 are able to shift in the second direction in an integrated manner. In other words, it is possible to reliably maintain a state in which a plurality of components of the left-side upper frame 8, the right-side upper frame 7, and the platen glass 12 are fixed to the housing 5 by the upper front frame 10.

The embodiments described above are examples and it is needless to say that the invention is not limited to the embodiments described above. For example, in the embodiments described above, the hook 6 as the first engagement section is provided on the housing 5 and the loop member 8a (7a) as the second engagement section is provided on the left-side upper frame 8 (right-side upper frame 7). In contrast, the hook 6 as the first engagement section may be provided on the left-side upper frame 8 (right-side upper frame 7) and the loop member 8a (7a) as the second engagement section may be provided on the housing 5.

In addition, the second inclined portion 6b is formed on the surface on one side of the hook 6 in the present embodiment; however, the second inclined portion 6b may be formed on both surfaces of the hook 6. That is, the same inclined portion as the second inclined portion 6b may be provided instead of the surface (vertical surface) 6d in FIG. 10 and the loop member 8a (left-side upper frame 8) may be configured so as to be detached in both the +X direction and the −X direction.

In addition, the first engagement section and the second engagement section can be configured as illustrated in FIGS. 12A and 12B. In FIGS. 12A and 12B, reference sign 18 represents a modification example of the left-side upper frame 8 described above, reference sign 18a represents a modification example of the loop member 8a described above, and reference sign 16 represents a modification example of the hook 6 described above. The hook 16 according to the present embodiment includes a first inclined portion 16a which is the inclined portion corresponding to the first inclined portion 6a formed on the hook 6 described above. Hence, the loop member 18a can engage with the hook 16 when the hook 16 is shifted downwardly from above. FIG. 12A illustrates such an engaged state.

In the present embodiment, the hook 16 does not include a second inclined portion 6b formed on the hook 6 described above. However, the loop member 18a is opened on one side in the X direction. Hence, when the left-side upper frame 18 is shifted in the +X direction (rightward in FIG. 12A), the loop member 18a can be disengaged from the hook 16 as illustrated in FIG. 12B from the engaged state between the hook 16 and the loop member 18a illustrated in FIG. 12A.

In this manner, the first engagement section and the second engagement section can employ various forms.

The entire disclosure of Japanese Patent Application No. 2014-131052, filed Jun. 26, 2014 is expressly incorporated by reference herein.

What is claimed is:

1. An image reading apparatus comprising:
a platen on which an original document is mounted;

a housing in which a read section that reads the original document mounted on the platen is provided; and at least one frame which is attached to the housing by using an engagement section and is formed around the platen, wherein the engagement section is configured to include a first engagement section provided on one of the housing or the frame and a second engagement section provided on the other one of the housing or the frame, and wherein the first engagement section includes a first inclined portion that allows engagement with the second engagement section to be performed when the frame is attached to the housing in a first direction which includes a vertically downward direction component, and a second inclined portion that allows the second engagement section to be disengaged from an engaged state between the first engagement section and the second engagement section when the frame is shifted with respect to the housing in a second direction intersecting with the first direction.

2. The image reading apparatus according to claim 1, wherein a plurality of the engagement sections are provided at intervals in the second direction.

3. The image reading apparatus according to claim 2, further comprising:

a first frame and a second frame, as the frame, which are positioned on both sides of the platen, respectively, in a direction intersecting with a traveling direction of the read section, wherein the first frame and the second frame are integrated with the platen and are shifted in the second direction.

4. The image reading apparatus according to claim 1, further comprising:

a first frame and a second frame, as the frame, which are positioned on both sides of the platen, respectively, in a direction intersecting with a traveling direction of the read section, wherein the first frame and the second frame are integrated with the platen and are shifted in the second direction.

5. The image reading apparatus according to claim 4, further comprising:

a third frame and a fourth frame which are positioned on both sides in the traveling direction of the read section, respectively, wherein at least one of the third frame or the fourth frame is detached and the first frame, the second frame, and the platen are able to shift in the second direction in an integrated manner.

6. The image reading apparatus according to claim 1, wherein the first engagement section is a protrusion on which the first inclined portion and the second inclined portion are formed, and wherein the second engagement section is a loop member having a window hole into which the protrusion is fit.

7. An image reading apparatus comprising:

a platen on which an original document is mounted;

a housing in which a read section that reads the original document mounted on the platen is provided; and at least one frame which is attached to the housing and is formed around the platen, wherein an engagement section at which the housing engages with the frame is configured to include a first engagement section provided on one of the housing or the frame and a second engagement section provided on the other one of the housing or the frame, wherein the first engagement section engages with the second engagement section when the frame is attached to the housing in a first direction which includes a vertically downward direction component, and wherein the first engagement section is disengaged from the second engagement section from an engaged state between the first engagement section and the second engagement section when the frame is shifted with respect to the housing in a second direction intersecting with the first direction.

8. The image reading apparatus according to claim 7, wherein a plurality of the engagement sections are provided at intervals in the second direction.

9. The image reading apparatus according to claim 8, further comprising:

a first frame and a second frame, as the frame, which are positioned on both sides of the platen, respectively, in a direction intersecting with a traveling direction of the read section, wherein the first frame and the second frame are integrated with the platen and are shifted in the second direction.

10. The image reading apparatus according to claim 7, further comprising:

a first frame and a second frame, as the frame, which are positioned on both sides of the platen, respectively, in a direction intersecting with a traveling direction of the read section, wherein the first frame and the second frame are integrated with the platen and are shifted in the second direction.

11. The image reading apparatus according to claim 10, further comprising:

a third frame and a fourth frame which are positioned on both sides in the traveling direction of the read section, respectively, wherein at least one of the third frame or the fourth frame is detached and the first frame, the second frame, and the platen are able to shift in the second direction in an integrated manner.

* * * * *